(12) United States Patent
Kapuria et al.

(10) Patent No.: US 10,843,625 B2
(45) Date of Patent: Nov. 24, 2020

(54) METHOD AND SYSTEM FOR ARTIFICIAL INTELLIGENCE BASED ADVANCED DRIVER ASSISTANCE

(71) Applicant: THE HI-TECH ROBOTIC SYSTEMZ LTD, Gurugram (IN)

(72) Inventors: Anuj Kapuria, Gurugram (IN); Ritukar Vijay, Gurugram (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 15/592,587

(22) Filed: May 11, 2017

(65) Prior Publication Data
US 2018/0257564 A1  Sep. 13, 2018

(30) Foreign Application Priority Data
Mar. 10, 2017  (IN) .............................. 201711008493

(51) Int. Cl.
| | | |
|---|---|---|
| B60Q 9/00 | (2006.01) |
| B60R 1/00 | (2006.01) |
| B60R 11/04 | (2006.01) |
| G07C 5/00 | (2006.01) |
| H04N 7/18 | (2006.01) |
| G06K 9/00 | (2006.01) |

(52) U.S. Cl.
CPC .............. B60Q 9/008 (2013.01); B60R 1/00 (2013.01); B60R 11/04 (2013.01); G06K 9/00785 (2013.01); G06K 9/00791 (2013.01); G06K 9/00845 (2013.01); G07C 5/008 (2013.01); H04N 7/181 (2013.01); *B60R 2300/105* (2013.01); *B60R 2300/107* (2013.01); *B60R 2300/207* (2013.01); *B60R 2300/50* (2013.01); *B60R 2300/8093* (2013.01)

(58) Field of Classification Search
None
See application file for complete search history.

(56) References Cited

U.S. PATENT DOCUMENTS

| | | | |
|---|---|---|---|
| 2015/0345981 A1* | 12/2015 | Goldman-Shenhar | ........................ G01C 21/3629 701/533 |
| 2016/0050356 A1* | 2/2016 | Nalepka | ............ H04N 5/23203 348/148 |
| 2017/0190337 A1* | 7/2017 | Singh | ..................... B60W 50/14 |
| 2017/0364082 A1* | 12/2017 | Taieb | ..................... G01C 21/32 |

\* cited by examiner

*Primary Examiner* — Edemio Navas, Jr.

(57) ABSTRACT

The present invention provides a method and system of historical reaction based driver advanced assistance. In this method, a combination of external environment to a vehicle on which the advanced driver assistance system (ADAS) is mounted fetched by forward looking cameras is combined with rear looking camera for internal environment or driver state, is generated. The generated combination is utilized to analyze is there is any critical situation that is upcoming. For providing feedback for such situation, processor within the ADAS transmits the current combination situation to a remote server that stores historical feedback and driver reactions for various combination of situations. For the current combination situation, a historical combination situation is fetched and corresponding feedbacks analyzed and an ideal feedback, that has comparatively least number of negative driver reactions, is determined.

14 Claims, 8 Drawing Sheets

METHOD AND SYSTEM FOR ARTIFICIAL INTELLIGENCE BASED ADVANCED DRIVER ASSISTANCE

TECHNICAL FIELD

This invention relates to an advanced driver assistance system (ADAS) and more particularly to an ADAS utilizing artificial intelligence techniques on a common pool of driver reaction to various driver feedback provided to drivers of different connected vehicles at different situations.

BACKGROUND OF THE INVENTION

Driver assistance systems are being widely used these days in vehicles. These systems help a driver to be attentive to the road by providing various kinds of information to the driver of the vehicle. Typically, such systems are in-built to the vehicle and vary from vehicle to vehicle. There are various ways in which the driver assistance systems help driver of the vehicle. In one such way, the driver assistance systems are equipped with front looking cameras that identify approaching situations. Then, a corrective action is taken in such situation.

Another type of driver assistance systems utilizes a driver state monitoring camera in addition to the forward-looking cameras. Data from both the modules is fused together and a warning is provided based on predictive danger due to a current situation. However, there is no measure of how the warning is provided and to what degree the warning should be applied.

Therefore, there exists the need for a better driver assistance system.

SUMMARY

The present invention comprises a driver assistance device having one or more of the features recited in the appended claims and/or one or more of the following features, which alone or in any combination may comprise patentable subject matter:

The objective of the invention is to provide an advanced driver assistance system (ADAS) with retrieval of ideal feedback to be provided in case of a current critical situation.

Accordingly, in an embodiment of the invention, there is provided an advanced driver assistance system (ADAS), wherein the system comprises a plurality of vehicles, wherein each of the plurality of vehicles includes, a forward-looking first camera, that is adapted to identify activity and objects in short-range vicinity of the vehicle. The system further includes a forward looking second camera, adapted to identify activity and objects in long-range vicinity of the vehicle. The system also includes a ranging module, adapted to measure distance objects in a straight path in-front of the vehicle. The system, further includes, a rear-looking third camera, that monitors driver state. The system also includes a processor, configured to receive inputs from the first camera, the second camera, the ranging module, the third camera. Processor identifies an upcoming critical situation from the inputs and transmits the critical situation information. Furthermore, the system includes a server, to which each of the plurality of vehicles is connected, that is configured to receive the critical situation information, wherein the server further maintains a database of historical reactions of drivers, of each of the plurality of connected vehicles, to feedback to critical situations faced by drivers and, wherein the server is further configured to identify and transmit, to the processor, ideal feedback to be provided to the driver of the vehicle facing the critical situation in real-time.

According to another aspect of the invention, there is provided a method for real-time driver assistance. The method includes gathering of external environment through a plurality of forward looking cameras connected to a processor; the method further includes capturing current driver state information through at least one rear looking camera, connected to the processor; generating, by the processor a combination of the current external environment and the current driver state information; determining, by the processor, a critical situation from the current combination information; transmitting, by the processor, the current combination information to a server through wireless communication protocol; and receiving, by the processor, an ideal feedback to the current combination information based on common pool of historical combination information similar to the combination generated by the processor from the server, wherein the server is configured to store a plurality of historical combinations of external environment and corresponding driver state data and a corresponding driver reaction to a feedback offered to the driver for a particular combination of external environment and driver state during the particular combination; and providing, by the processor, the ideal feedback to the driver of the vehicle for the critical situation.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

BRIEF DESCRIPTION OF THE ACCOMPANYING DRAWINGS

The foregoing summary, as well as the following detailed description of various embodiments, is better understood when read in conjunction with the drawings provided herein. For the purpose of illustration, there is shown in the drawings exemplary embodiments; however, the presently disclosed subject matter is not limited to the specific methods and instrumentalities disclosed.

DETAILED DESCRIPTION OF THE INVENTION

The following detailed description is directed to certain specific embodiments of the invention. However the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
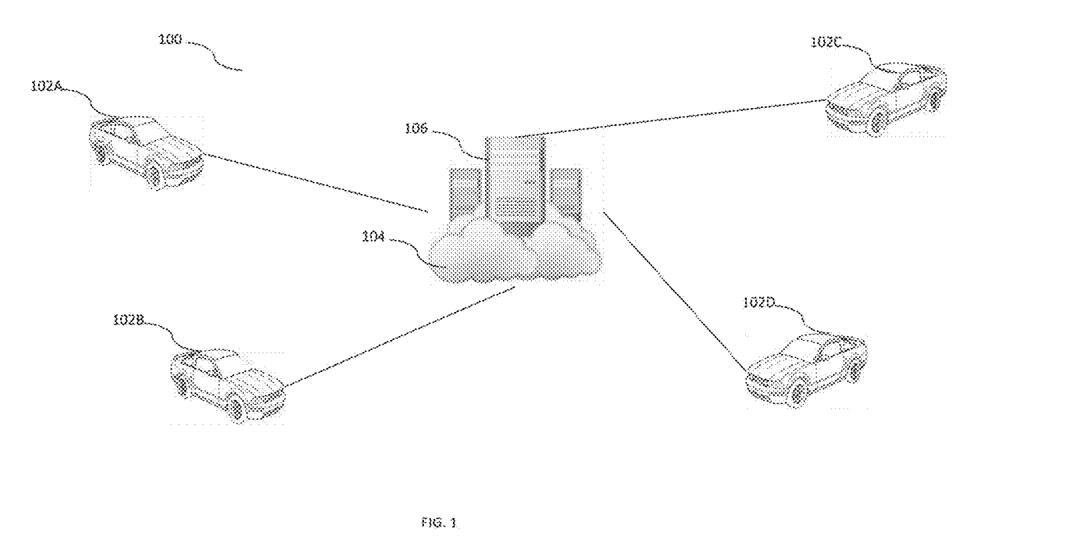
FIG. 1 is a block diagram illustrating an advanced driver assistance system, in accordance with an embodiment of the invention.

Referring now to FIG. 1, illustrating a line diagram of an advanced driver assistance system (ADAS) 100. The ADAS 100 includes a plurality of vehicles 102A-102C (hereinafter referred to as 102), all connected to a server 104. In an embodiment of the invention, the plurality of vehicles 102 are connected to the server 104 through wireless communication protocols. Wireless communication protocols can be one among a mobile communication protocol, or satellite communication protocol. Each vehicle from the plurality of vehicles 102 includes an advanced driver assistance device 200 (to be described in detail in FIG. 2). In an embodiment of the invention, the plurality of vehicles can be one among cars, trucks, buses, etc. Also, in another embodiment of the invention, the server 104 is a cloud computing server placed remotely from the plurality of vehicles 102 connected to it. The server 104, further includes a database 106 that stores historical combination situations, that included critical information, and reaction of drivers of the plurality of vehicles 102, when a feedback of certain intensity was provided to the drivers. The server 104 is able to identify or determine an ideal feedback that is a feedback from historical combination situations that had least number of negative reactions from the drivers in comparison to positive or neutral reactions for the same feedback. The ideal feedback is then transmitted back to the vehicle facing the current critical situation. Further, the system 100 stores all the information in order to provide similar inputs to drivers in future critical conditions.

Figure 2:
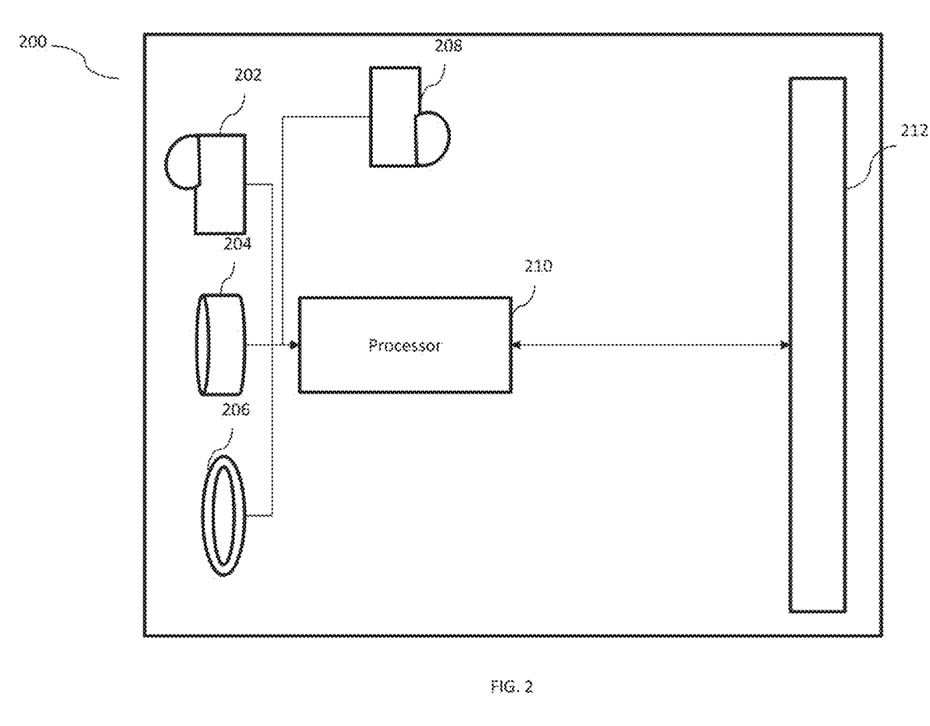
FIG. 2 is a line diagram illustrating an advanced driver assistance device for functioning of the driver assistance system, in accordance with an embodiment of the invention.

Referring now to FIG. 2, illustrates a block diagram illustrating an advanced driver assistance device 200. The system 200 is vehicle mounted. In an embodiment of the invention, the system 200 is windshield mounted or mounted on "A" pillar of the vehicle. Furthermore, in another embodiment of the invention the system 200 can be a single casing device that will be explained in detail in conjunction with FIGS. 3a and 3b. The system 200 includes a forward looking first camera 202. The forward-looking first camera 202, in an embodiment of the invention, can be a twin lens stereo camera. The first camera 202 is adapted to identify activity and objects that are within the close-range vicinity of the vehicle on which it is mounted.

System 200 further includes, a forward-looking second camera 204. The second camera 204 is a long range narrow field camera that identifies activity and objects in long-range vicinity of the vehicle on which system 200 has been mounted. Furthermore, the system 200, includes a ranging module 206. The ranging module 206 identifies and determines distance of objects lying in front of the vehicle. The ranging module 206, in an embodiment of the invention, is a Light Detection and Ranging (LIDAR) module based on LIDAR method. As already known in the art, LIDAR is a device distance to a target by illuminating that target with a laser light. For this purpose, LIDAR includes a transmitter to transmit laser light and a receiver to receive the reflected laser light.

Still referring to FIG. 2, the system 200 includes a rear-looking third camera 208. The third camera 208 helps in identifying driver profile and monitor driver's state. Third camera 208 can identify the driver whether it's an old person, a woman, a young boy, etc. Also, the camera 208 has ability to identify various kinds of reactions of the driver. Whether the driver is happy, angry, sad, worried, tensed etc. The camera 208 is also equipped with features to identify whether driver is attentive or not, is the driver sleepy, or looking at phone etc. Hence, the third camera 208 is equipped to monitor driver state.

System 200, further includes a processor 210, to which are connected the first camera 202, the second camera 204, the ranging module 206 and the third camera 208. Processor 210, takes inputs from all the three cameras and processes the information thus gathered. The information gathered from first camera 202, the second camera 204 and the ranging module 206 provides external environment information of the vehicle on which the system 200 is mounted. The processor 210, also takes input from the third camera 208 that gives the processor 210 information about the driver state and driver's profile. The processor 210 categorizes information into external and driver state information.

Still referring to FIG. 1, the processor 210, after analyzing current external environment input and current driver state, identifies a threat or a critical situation that is upcoming based on the combination of current information or even based on individual information. Hence, the processor 210 queries the memory 112 to find such a combination and the corresponding feedback given to the driver and the driver reaction after the feedback was provided to the driver. Hence, based on the feedback given and the driver reaction to the historical combination of information, a decision is taken by the processor 210. The decision of the processor 210, decides whether to keep the intensity of the feedback same as previous, decrease, or increase the intensity of the feedback and forward the decision to a feedback module 212 of the vehicle. Feedback module can either give a visual warning to the driver, a haptic warning or an audio warning to the driver.

Figure 3A:
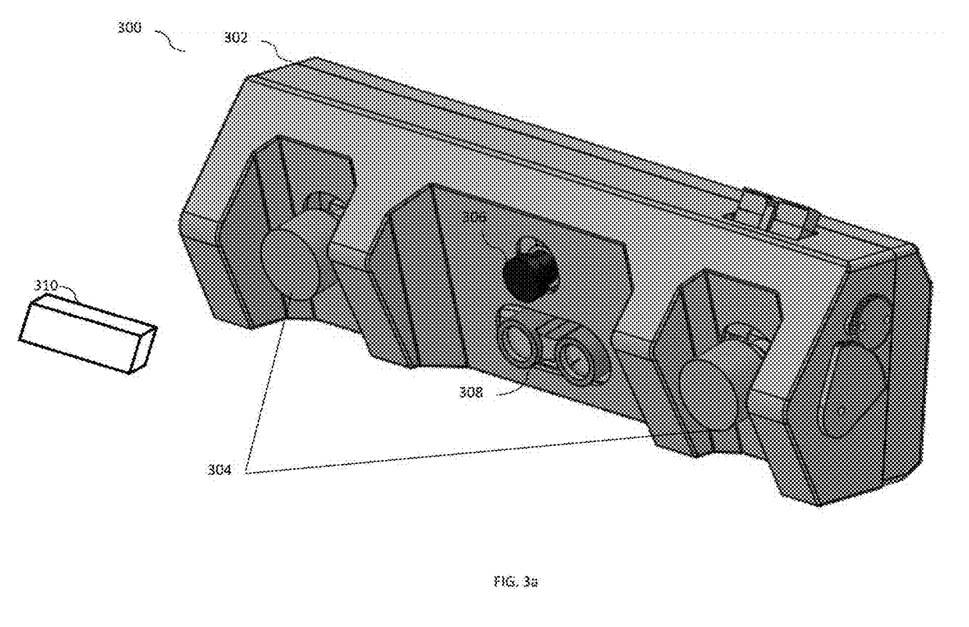
FIG. 3a is a line diagram illustrating front view of an advanced driver assistance device, in accordance with an embodiment of the invention.

Now referring to FIG. 3a, a line diagram illustrating front view of an advanced driver assistance system (ADAS) 300, in accordance with an embodiment of the invention. The ADAS 300 includes a single housing unit 302. In an embodiment of the invention, the single housing unit 302 is made up of anyone or a combination of a plastic, a fiber, a metal, etc. Single housing unit 302 houses a plurality of camera modules. The camera modules include a first camera 304 that is, in an embodiment, a stereo camera and hence is a twin lens camera adapted to capture activity and identify objects in close-range vicinity of the vehicle. The first camera 304 is adapted to function efficiently in low speed ranges of the vehicle that is in a range of 1-20 mph. Further, the ADAS 300 includes a second camera 306. The second camera 306 can be a long-range, narrow field camera adapted to identify activity and objects in long-range vicinity of the vehicle. The second camera 306 functions efficiently at higher speed that is in speed more than 20 mph.

Still referring to FIG. 3*a*, the ADAS 300 further includes a ranging module 308. The ranging module 308 is a Light and Detection Ranging (LIDAR) module. The ranging module 308 determines distance to the objects in front of the vehicle to which ADAS 300 is mounted. For this, the ranging module includes a laser emitter and a laser receiver. The emitter, emits laser waves which when reflects from the object is received by the receiver and hence calculates the distance to that object. In this way, the ranging module keeps in check what all objects are in-front and what is a safe distance from such objects. The ADAS 300 may have a control unit 310 that may be placed on dashboard of the vehicle whereas ADAS 300 might be mounted on windshield of the vehicle. All data is although captured by ADAS 300 however, processing might take place within the control unit 310 that might also control feedback input to the driver.

Figure 3B:
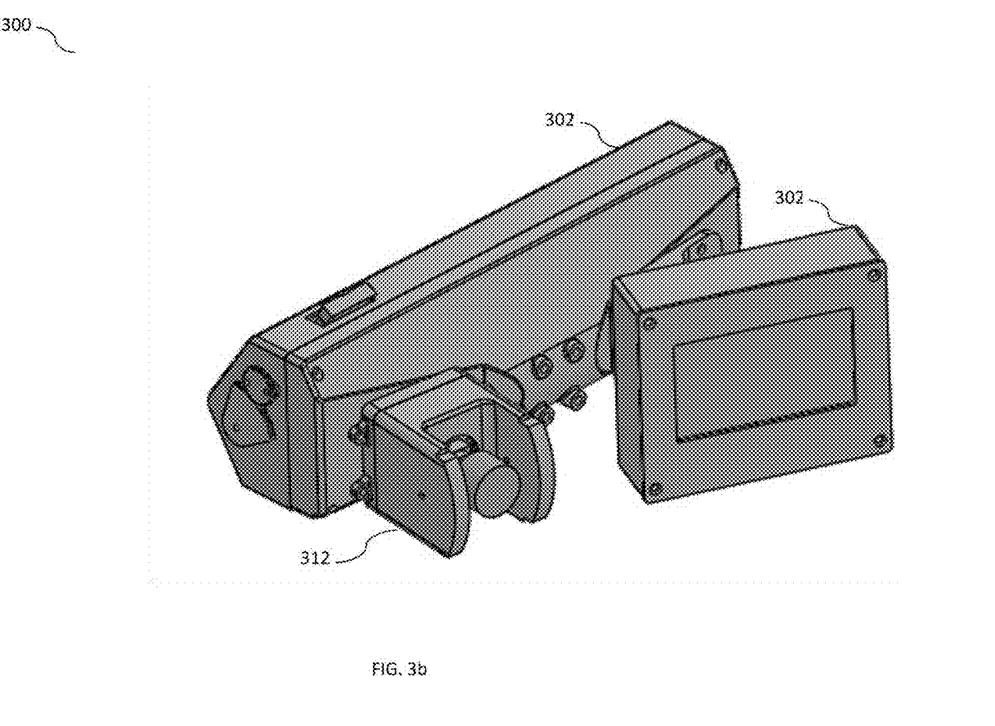
FIG. 3b is a line diagram illustrating rear view of an advanced driver assistance device, in accordance with an embodiment of the invention.

Now referring to FIG. 3*b*, a line diagram illustrating rear view of the ADAS 300. As indicated above, the ADAS 300 includes the single housing unit 302. At the rear side of the ADAS 300 is attached a driver state monitoring (DSM) device 312. The DSM device 312 is adapted to monitor driver state. The driver state may include driver profiling like driver age, driver sex, driving behavior. Also, driver monitoring may include emotions like sad, happy, angry, drowsy, sleepy, tired, anxious etc. There is also attached a warning device 302 on rear-side of the ADAS 300. The warning device 302 can be either a display device for a visual warning, or can give an audio-visual warning, an audio warning alone or can be attached to the control unit 310 which in turn is connected to an electronic control unit (ECU) of the vehicle (not shown in figure) for a haptic warning provided to driver through the steering. The DSM module 312 also captures reaction of the driver to feedback given in some situations and this information is stored in the memory 112.

Figure 4:
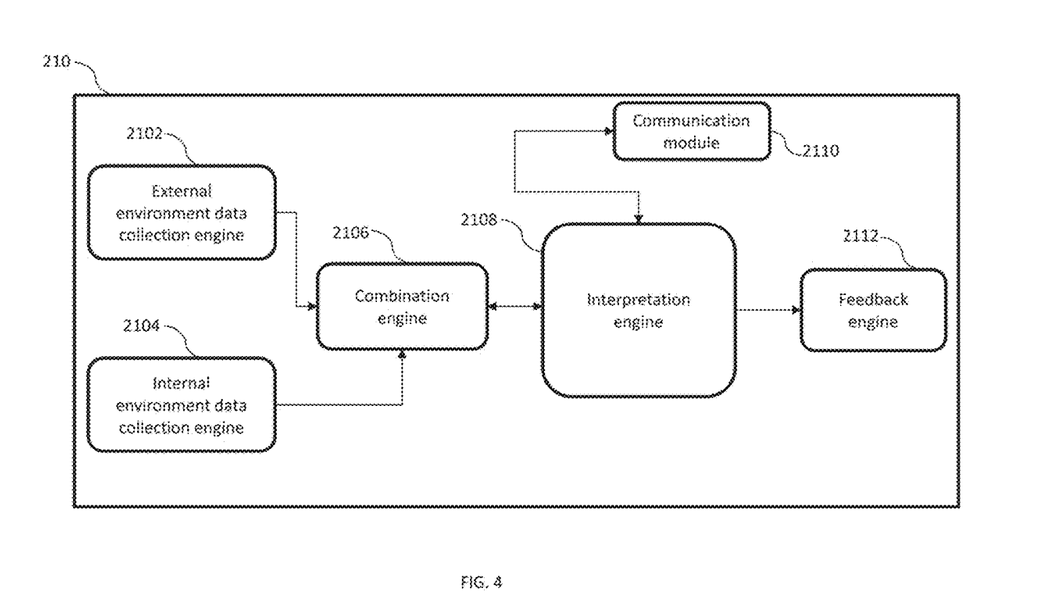
FIG. 4 is a block diagram illustrating a processor module, in accordance to an embodiment of the invention.

Now referring to FIG. 4 illustrating internals of the processor 210, in accordance with an embodiment of the invention. The processor 210 is either placed within the ADAS 300 or can be placed in the control unit 310. The processor 210 includes an external environment data collection engine 2102. This external environment data collection engine takes inputs from the first camera 202, the second camera 204, the ranging module 206 and combines the information to form external environment data. The processor 210 also includes an internal environment data collection engine 2104, that is adapted to take input from the third camera 208 that identifies driver state. Processor 210 further includes a combination engine 2106 that takes its input from the external environment data collection engine 2102 and the internal environment data collection engine 2104 and combines this information to form a current situation combination. The current situation combination is then sent to an interpretation engine 2108. The interpretation engine 2108 then determines whether it is a critical situation or not. Critical situation, to a person ordinarily skilled in the art would appreciate, will be a situation that requires feedback to the driver like, speed limit in approaching road is 45 mph however, driver is drowsy. Such a situation is a critical situation. Hence, the interpretation engine 2108 identifies such situation from the current situation combination. After fetching the critical situation from the current situation combination, the interpretation engine 2108 then initiates a communication module 2110 that connects with the server 104 to fetch an ideal feedback from the database 106 within the server 104.

Figure 5:
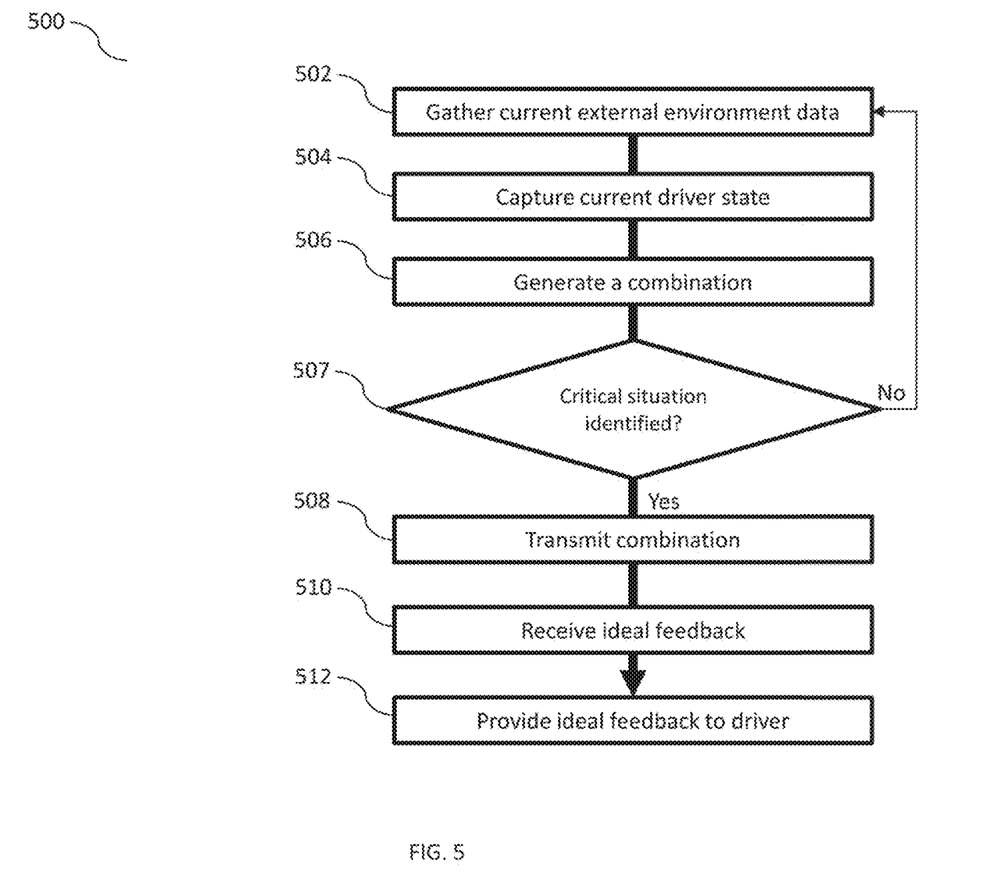
FIG. 5 is a flow chart illustrating a method of real-time driver assistance, in accordance to an embodiment of the invention.

Now referring to FIG. 5, a flow chart illustrating a method 500 for real-time driver assistance, in accordance to an embodiment of the invention. The method 500 analyzes current situation in and around the vehicle and the driver state and provides feedback to the driver by analyzing historically similar situation. The method 500 starts at step 502 at which current external environment data is gathered using the advanced driver assistance device (ADAD) 300. The current external environment data, as already explained above, is collected using the first camera 304, the second camera 306 and the ranging module 308. Further, at step 504, driver's current state is captured. Now moving at step 506, a current combination situation is generated using the external environment and the driver current state. At step 507, the interpretation engine 2108 of the processor 210, determines, whether or not there is a critical situation upcoming in the current situation combination. If no, the method is restarted at step 502. However, if there is a critical situation determined, then, at step 508, the processor 210 transmits the current situation combination to the server 104. The server 104 determines the ideal feedback for the current situation combination using historically similar situation combinations stored in the database 106 maintaining a common pool of various situation combinations and corresponding reaction of various drivers to different intensity feedbacks provided to them. Hence, for a similar kind of situation various intensity feedbacks and driver reactions to such various intensities are also stored within the database 106. Further, at step 510, the processor 210 receives the ideal feedback from the server 104 which at step 512 is provided or applied to the driver of the vehicle facing the critical situation. In an embodiment of the invention, the ideal feedback is the feedback which has least number of negative driver reactions comparatively.

Figure 6:
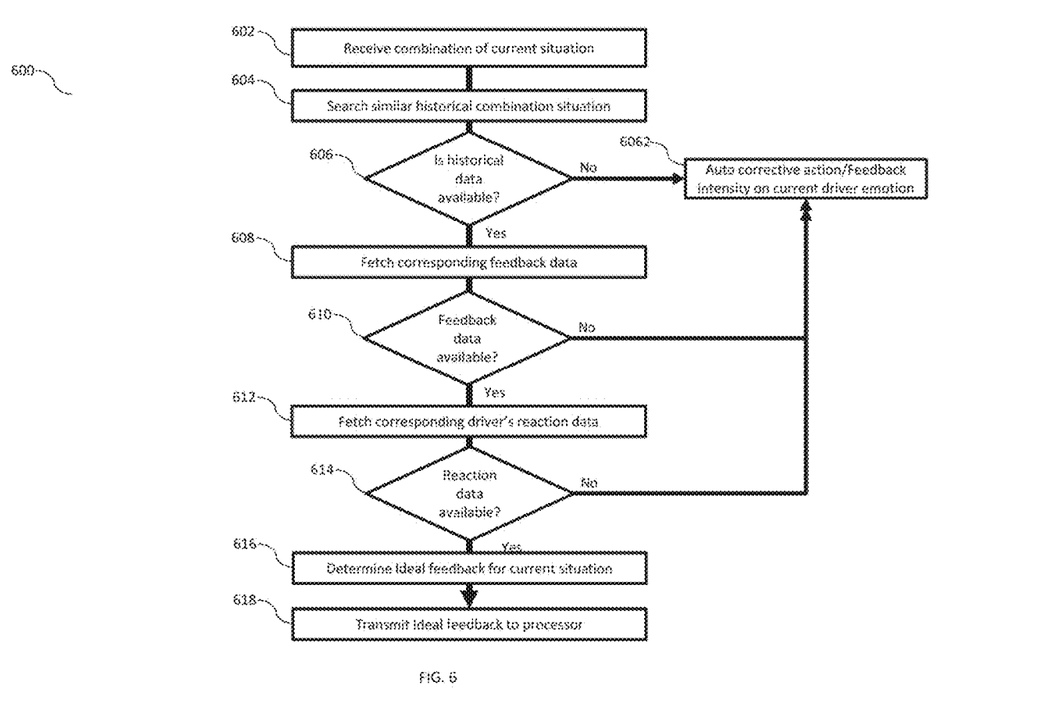
FIG. 6 is a flow chart illustrating a method of determining ideal feedback, in accordance to an embodiment of the invention.

Now referring to FIG. 6, a flow chart illustrating a method 600 of determining ideal feedback to the current situation combination. The method starts at step 602, at which the server 104 receives the current situation combination information from the processor 210 after the processor 210 has identified that there is a critical situation that the vehicle from the plurality of vehicles 102 is facing. The server 104 after receiving the current situation combination from the processor 210, at step 604 fetches a similar historical situation combination from the database 106. As disclosed earlier, the database 106 maintains a common pool of various situation combinations faced by drivers of the plurality of vehicles 102 and their corresponding reactions to various intensity feedbacks provided to drivers. In an embodiment of the invention, the server 104 extracts the GPS coordinates from the current situation combination for locating area within which the driver is.

At step 606, the server 104 checks if such a historical situation combination exists or not. If not, then the server 104 either communicates back with the processor 210 and informs that no similar combination exists and processor 210 gives a predetermined feedback to the driver or the server 104 itself transmits the predetermined feedback to the processor 210 which is then provided to the driver at step 6062. The predetermined feedback can be either an auto-corrective action that is assistive breaking, wipers on etc. Also, in other embodiment of the invention, the predetermined feedback provided is based on current driver state information.

Further, at step 608, if the historical situation combination is present, the server 104 then fetches corresponding feedbacks provided to the drivers at that time. Now, if at step 610, no such feedback is available within the database 106, then the method 600 is directed to step 6062 again. However, if such feedback is available within the database 106, then at step 612, the server fetches the corresponding driver reaction for the feedback provided. In an embodiment of the invention, the server 104 fetches corresponding feedback that was provided to the drivers at that particular location which is extracted by GPS coordinates.

Figure 7:
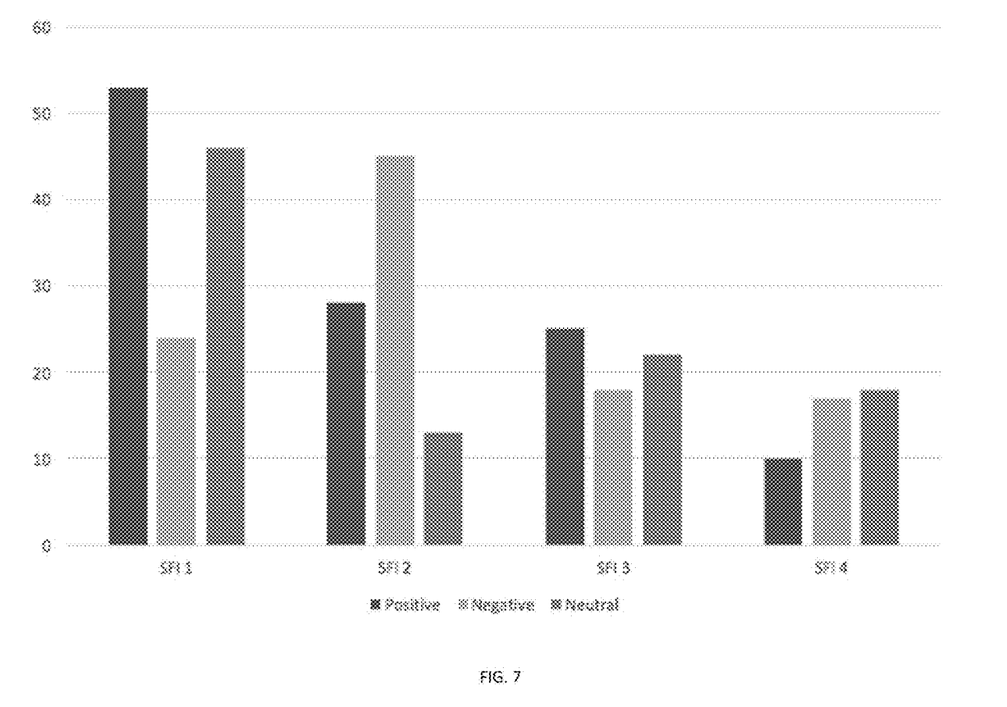
FIG. 7 is a graph illustrating a comparative study for various driver reactions, in accordance to an embodiment of the invention.

At step 614, the server 104, checks if the reaction data is available or not. If the reaction data is not available, then the server 104 reverts to step 6062 for assistive correction or predetermined feedback. However, in case the reaction data is available, then the server 104 determines ideal feedback for the current situation combination. Ideal feedback is identified by gathering feedback of what intensity has been provided to the drivers facing similar kind of situations. Now, as depicted in FIG. 7, a graph illustrating a comparative analysis for ideal feedback, for a similar situation, four degrees of intensities were provided i.e. SFI 1, SFI 2, SFI 3 and SFI 4. The three columns depict positive, negative and neutral reactions of the number of users for a complete set of data available within the database 106. Hence, the server 104 determines that for the current situation combination, the intensity of feedback is to be same as that in SFI 1, since comparatively the number of negative reactions to the intensity of the feedback SFI 1 is less as compared to a combination of positive or neutral, or individually positive, or individually neutral. In other embodiment of the invention, the comparisons can be prioritized and weighted as well. Weightage of combination of positive with neutral is more than individually positive which is higher than individually neutral. Hence, comparatively the feedback intensity of SFI 1 is best suited for current situation combination.

Driver emotions are defined as positive, negative and neutral. Positive driver emotion means there is a little complacency in the driver. This could be due to confidence of the driver or his driving style. Neutral driver emotion is described as no emotion from the driver, that means the driver is OK with the kind of feedback provided. Negative emotion is defined as frightened or scared or anxious due to the feedback provided.

At step 618, the ideal feedback is transmitted to the processor 210 as a feedback input.

Aspects of the present subject matter are described herein with reference to flowchart illustrations and/or block diagrams of methods and apparatus (systems) according to embodiments of the subject matter. It will be understood that each block of the flowchart illustrations and/or block diagrams, and combinations of blocks in the flowchart illustrations and/or block diagrams, can be implemented by computer readable program instructions.

While there has been shown, and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. An advanced driver assistance system, wherein the system comprises;
    a plurality of vehicles, wherein to each of the plurality of vehicles includes:
    a forward looking first camera, adapted to identify activity and objects in short-range vicinity of the vehicle;
    a forward looking second camera, adapted to identify activity and objects in long-range vicinity of the vehicle;
    a ranging module, adapted to measure distance to objects in a straight path;
    a rear looking third camera, wherein the third camera is configured to monitor driver state;
    a processor, configured to receive inputs from the forward looking first camera, the forward looking second camera, and the ranging module,
    wherein the processor identifies a critical situation based on the inputs and transmit the critical situation information;
    a server, to which each of the plurality of vehicles is connected, configured to receive the critical situation information, wherein the server further maintains a database of historical reactions of drivers, of each of the plurality of vehicles connected to the server, to provide feedback to critical situations faced by drivers and, wherein the server is further configured to identify and transmit, to the processor, ideal feedback to be provided to the driver of the vehicle facing the critical situation in real-time based on the current situation combination using historically similar situation combinations stored in the database maintaining a common pool of various situation combinations and corresponding reaction of various drivers to different intensity feedbacks provided to them, wherein the ideal feedback is feedback that has comparatively least number of negative driver reactions.

2. The system of claim 1, wherein the first camera is a stereo camera having a short focal length.

3. The system of claim 1, wherein the second camera is a long range narrow field camera having a long focal length.

4. The system of claim 1, wherein the ranging module is a light detection and ranging (LiDAR) unit.

5. The system of claim 1, wherein the third camera monitors driver state by capturing eye gaze and facial expressions of the driver.

6. The system of claim 1, wherein the historical reactions includes anyone or a combination of intensity of reaction, time to braking, or facial expressions during reaction.

7. The system of claim 1, wherein the feedback is any one or a combination of an audio feedback, a visual feedback, or a haptic feedback.

8. A real-time driver assistance method, comprising;
gathering current external environment information through a plurality of forward looking cameras connected to a processor;
capturing current driver state information through at least one rear looking camera, connected to the processor;
generating, by the processor a current combination information based on the current external environment and the current driver state information;
determining, by the processor, a critical situation from the current combination information;
transmitting, by the processor, the current combination information to a server through wireless communication protocol; and
receiving, by the processor, an ideal feedback to the current combination information based on common pool of historical combination information similar to the combination generated by the processor from the server, wherein the server is configured to store a plurality of historical combinations of external environment and corresponding driver state data and a corresponding driver reaction to a feedback offered to the driver for a particular combination of external environment and driver state during the particular combination; and
providing, by the processor, the ideal feedback to the driver of the vehicle for the critical situation based on the current situation combination using historically similar situation combinations stored in the database maintaining a common pool of various situation combinations and corresponding reaction of various drivers to different intensity feedbacks provided to them, wherein the ideal feedback is feedback that has comparatively least number of negative driver reactions.

9. The real-time driver assistance method of claim 8, wherein the plurality of forward looking cameras includes anyone or a combination of a stereo camera, or a long range narrow field camera.

10. The real-time driver assistance method of claim 8, wherein the server is a remote server.

11. The real-time driver assistance method of claim 8, wherein the reaction includes anyone or a combination of intensity of reaction, time to braking, or facial expressions during reaction.

12. The real-time driver assistance method of claim 11, wherein profile of the driver is stored in the external environment captured using the at least one rear looking camera.

13. The real-time driver assistance method of claim 12, wherein the driver profile includes data like age bracket, sex, or general emotional state while driving.

14. The real-time driver assistance method of claim 8, wherein the processor also combines the driver profile along with the historical reaction to the similar historical combination.

* * * * *